United States Patent
Steinberger et al.

(10) Patent No.: US 11,921,909 B2
(45) Date of Patent: Mar. 5, 2024

(54) METHOD FOR ADJUSTING OPERATION PARAMETERS OF AN ELECTRICAL DEVICE

(71) Applicant: Future Systems Besitz GmbH, Rödental (DE)

(72) Inventors: Philipp Steinberger, Coburg (DE); Peter Spiel, Regensburg (DE); Florian Brehm, Roedental (DE)

(73) Assignee: Future Systems Besitz GmbH, Rödental (DE)

( * ) Notice: Subject to any disclaimer, the term of this patent is extended or adjusted under 35 U.S.C. 154(b) by 0 days.

(21) Appl. No.: 17/759,394

(22) PCT Filed: Nov. 18, 2021

(86) PCT No.: PCT/EP2021/082200
§ 371 (c)(1),
(2) Date: Jul. 25, 2022

(87) PCT Pub. No.: WO2022/106567
PCT Pub. Date: May 27, 2022

(65) Prior Publication Data
US 2023/0055971 A1    Feb. 23, 2023

(30) Foreign Application Priority Data
Nov. 20, 2020 (DE) ................. 20209001.5

(51) Int. Cl.
| G06F 21/81 | (2013.01) |
| G06F 3/04847 | (2022.01) |
| G06F 21/31 | (2013.01) |

(52) U.S. Cl.
CPC ......... *G06F 21/81* (2013.01); *G06F 3/04847* (2013.01); *G06F 21/31* (2013.01)

(58) Field of Classification Search
CPC ....... G06F 21/81; G06F 21/31; G06F 3/04847
See application file for complete search history.

(56) References Cited

U.S. PATENT DOCUMENTS

| 4,945,443 A * | 7/1990 | DeBiasi | ................. H02H 3/006 |
| | | | 361/679.08 |
| 6,289,267 B1 * | 9/2001 | Alexander | ............... H02H 3/00 |
| | | | 700/297 |

(Continued)

FOREIGN PATENT DOCUMENTS

| DE | 102014217292 A1 | 3/2016 |
| EP | 2 001 036 A1 | 12/2008 |

(Continued)

OTHER PUBLICATIONS

European Search Report, EP 20 20 9001.
European Search Report Opinion, EP 20 209 001.5.

*Primary Examiner* — Terrell S Johnson
(74) *Attorney, Agent, or Firm* — Maginot, Moore & Beck LLP

(57) ABSTRACT

An apparatus (1) provided to connect at least one device (2) to a power distribution system (3), said apparatus (1) comprising a human machine interface, HMI, (4) having elements to interact with the apparatus (1), wherein the human machine interface elements (11,12) are adapted to display and/or to adjust setting values of operation parameters of the at least one connected device (2), wherein access to one or more human machine interface elements is restricted by at least one access restriction mechanism of said apparatus (1) to enhance the operation security of the at least one device (2) connected via said apparatus (1) to said power distribution system (3) and/or to enhance the operation security of the apparatus (1) and/or of the power distribution system (3).

31 Claims, 6 Drawing Sheets

(56) References Cited

U.S. PATENT DOCUMENTS

2006/0229740 A1 10/2006 Kreisel et al.
2009/0206059 A1* 8/2009 Kiko .................... G05F 1/66
                                                          218/143
2012/0092802 A1 4/2012 Weiher

FOREIGN PATENT DOCUMENTS

| EP | 2 031 724 A2 | 3/2009 |
| EP | 2 031 724 A3 | 5/2012 |
| KR | 1020130001343 A1 | 6/2011 |

* cited by examiner

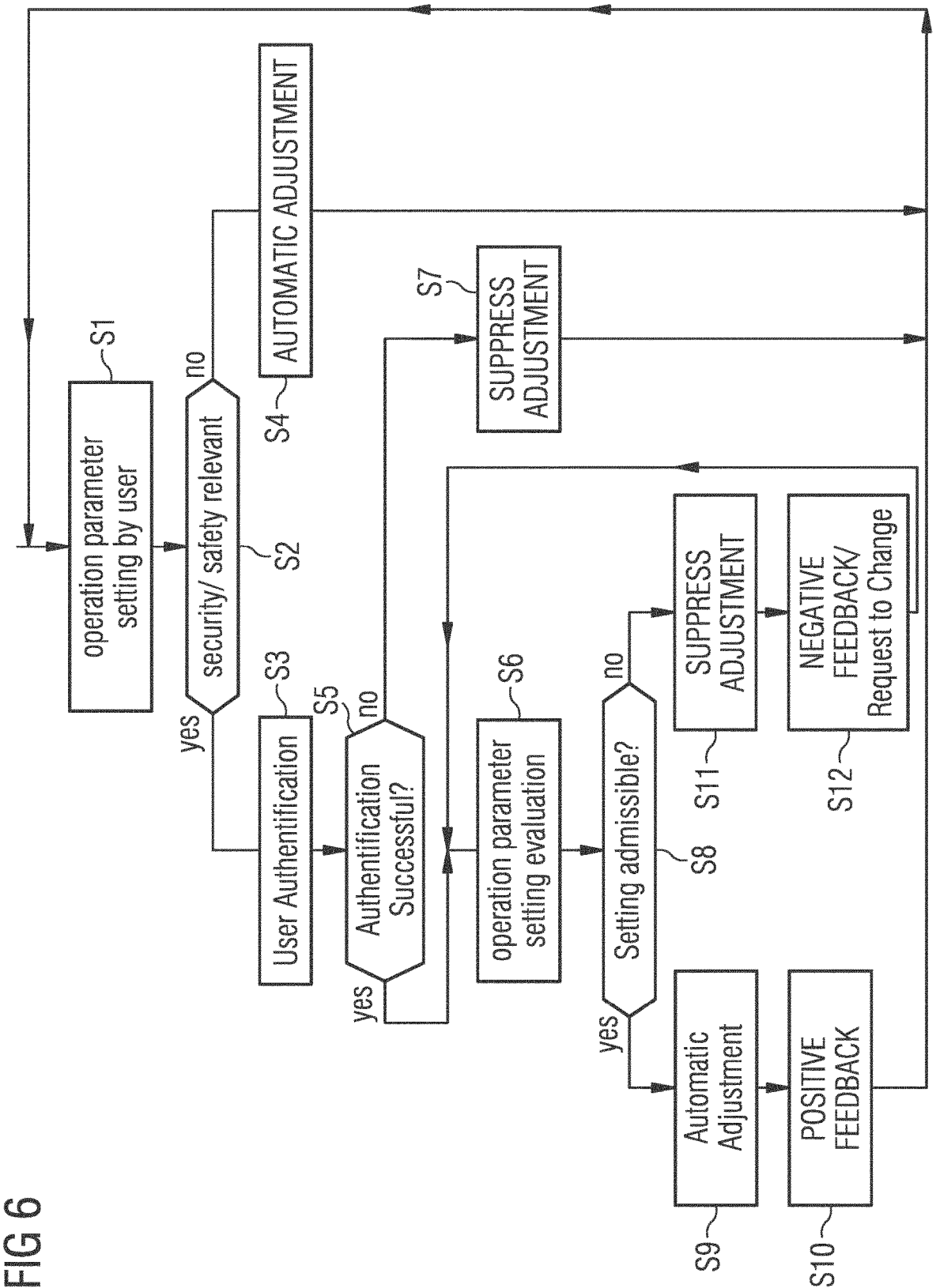

METHOD FOR ADJUSTING OPERATION PARAMETERS OF AN ELECTRICAL DEVICE

TECHNICAL FIELD

The invention relates to a computer-implemented method for adjusting operation parameters of an electrical device connected via a control apparatus to a power distribution system.

TECHNICAL BACKGROUND

A power distribution board also known as a panel board forms a component of a power supply system which can divide electrical power received from a power distribution system or a power network into subsidiary circuits of devices. A distribution board can provide also protective fuses or circuit breakers for each circuit of a device connected to the distribution board. An industrial control panel can comprise an assembly of components such as motor controllers, overload relays, fuse disconnect switches linked via a control apparatus to a busbar or rails of a power distribution system. Operation parameters of the connected devices or loads can be set by a user. A user can set operation parameters for a load or a device connected to the power distribution system by means of an interface. Erroneous settings of operation parameters, in particular by unauthorized persons or users can have severe consequences for the operation of the connected devices. The operation of the connected devices can be even affected in such a way that safe operation of the connected devices and/or of the control apparatus used for connecting the devices to the power distribution can no longer be guaranteed. Accordingly, the operation safety but also the personal security of the user can be compromised by wrong settings of operation parameters of devices connected to the power distribution system.

Accordingly, there is a need to provide a method and an apparatus increasing the operation safety of devices connected to a power distribution system and the security for a user.

SUMMARY OF THE INVENTION

The invention provides according to a further aspect a computer-implemented method for adjusting operation parameters of at least one device connected via a control apparatus to a power distribution system,
wherein the computer-implemented method comprises the steps of: checking automatically in response to a setting of an operation parameter of said device input by a user by means of a human machine interface element of a human machine interface of said control apparatus whether the respective device operation parameter is security-relevant for the operation of the connected device, security-relevant for the operation of the control apparatus itself and/or security-relevant for the operation of the power distribution system;
performing a user authentication of the user if the operation parameter setting input by the user is found to be security-relevant;
evaluating the operation parameter setting of the security-relevant operation parameter input by a successfully authenticated user to determine whether the input operation parameter setting is admissible; and
performing automatically an adjustment of the operation parameter of the connected electrical device if the evaluated operation parameter setting of the security-relevant operation parameter input by the authenticated user is determined to be admissible.

Possible embodiments of the computer-implemented method according to the first aspect of the present invention are indicated in the associated sub claims.

In a possible embodiment of the computer-implemented method according to the first aspect of the present invention the determining whether the input operation parameter setting is admissible comprises processing by a processor of the control unit of said control apparatus of preconfigured or loaded device characteristics of the electrical device connected via a control and data interface to said control apparatus.

In a possible embodiment of the computer-implemented method according to the first aspect of the present invention determining whether the input operation parameter setting is admissible comprises analyzing by a setting value user assistance algorithm (SUA) executed on a processor of a control unit of said control apparatus setting values of operation parameters with respect to the device characteristics of the connected electrical device to determine whether the setting values of the input operation parameters are within an admissible operation parameter range of the respective electrical device.

In a possible embodiment of the computer-implemented method according to the first aspect of the present invention the device characteristics of the connected electrical device are fetched from a local memory of the connected electrical device via the control and data interface of said control apparatus and are stored in a local device characteristic memory of said control apparatus for further processing by the processor of the control unit of said control apparatus.

In a possible embodiment of the computer-implemented method according to the first aspect of the present invention if the input operation parameter setting values are in conflict with the other operation parameters, the input operation parameter setting is determined by the setting value user assistance algorithm (SUA) executed on the processor of the control unit of said control apparatus to be not admissible.

In a possible embodiment of the computer-implemented method according to the first aspect of the present invention the setting value user assistance algorithm (SUA) executed on the processor of the control unit of said control apparatus calculates and adapts automatically admissible operation parameter ranges for operation parameters of the connected electrical device depending on an input or a detected type of the connected electrical device and/or depending on a monitored operation state of the connected electrical device and/or depending on processed sensor data received from sensors provided at the connected electrical device, depending on data exchange with other control units) via a data bus and/or depending on a required predefined operation security level.

In a possible embodiment of the computer-implemented method according to the first aspect of the present invention an automatic adjustment of the operation parameter setting is performed without user authentication if the operation parameter setting input by the user is found to be not security-relevant.

In a possible embodiment of the computer-implemented method according to the first aspect of the present invention the operation parameter setting input by the user is suppressed if the user is not successfully authenticated or is suppressed if the evaluated parameter setting is determined to be not admissible.

In a possible embodiment of the computer-implemented method according to the first aspect of the present invention the authentication of the user is performed by an authentication mechanism executed by a processor of a control unit of the control apparatus.

In a possible embodiment of the computer-implemented method according to the first aspect of the present invention if the analyzed input setting values of the operation parameters are found to be admissible by the setting value user assistance algorithm (SUA) executed on the processor of the control unit a positive feedback signal, in particular a color-coded feedback signal, is output to the user (by human machine interface elements of the human machine interface, HMI, indicating that the input setting values of the operation parameters are admissible and the corresponding operation parameters of the connected electrical device are automatically adjusted accordingly by the control unit of the control apparatus.

In a possible embodiment of the computer-implemented method according to the first aspect of the present invention if the analyzed input setting values of the operation parameters are found to be not admissible by the setting value user assistance algorithm (SUA) executed on the processor of the control unit), a negative feedback signal, in particular a color-coded feedback signal, is output to the user via the human machine interface elements of the human machine interface, HMI, indicating the inadmissibility of the previously input setting values of the operation parameters and/or a request to change the input setting values of the operation parameters is output via the human machine interface elements of the human machine interface, HMI, of said control apparatus to the user and/or admissible operation parameter settings, in particular operation parameter settings in admissible operation parameter ranges, are suggested by the setting value user assistance algorithm (SUA) to the user.

In a possible embodiment of the computer-implemented method according to the first aspect of the present invention a troubleshooting user assistance algorithm (TUA) executed on the processor of the control unit of said control apparatus does provide automatically troubleshooting assistance to the user in case of inadmissible setting values of the operation parameters and controls light signals sources indicating where a root cause for a detected operation fault is located.

In a possible embodiment of the computer-implemented method according to the first aspect of the present invention operation faults occurring during operation of the connected electrical device are displayed via the human machine interface, HMI, to the user and troubleshoot assistance to handle the displayed operation faults is provided by a troubleshooting user assistance algorithm (TUA) executed on the processor of the control unit of said control apparatus.

The invention provides according to a further aspect a control apparatus provided to connect at least one device to a power distribution system, said control apparatus comprising a human machine interface, HMI, having human machine interface elements used to interact with the control apparatus,
- wherein the human machine interface elements are adapted to display or to adjust setting values of operation parameters of the at least one connected electrical device,
- wherein the operation parameter setting of the connected electrical device is performed by a computer-implemented method according to the first aspect of the present invention.

In a possible embodiment of the control apparatus according to the second aspect of the present invention access to one or more human machine interface elements of the human machine interface, HMI, is restricted by at least one access restriction mechanism (AR) of said control apparatus to enhance the operation security of the at least one electrical device connected via said control apparatus to said power distribution system and/or to enhance the operation security of the control apparatus and/or of the power distribution system.

In a possible embodiment of the control apparatus according to the second aspect of the present invention the control apparatus comprises a control unit having at least one processor adapted to execute a computer-implemented user assistance algorithm (TUA) which provides assistance to the user for performing troubleshooting in case of erroneous operation parameter settings and/or adapted to execute a computer-implemented access restriction mechanism (SAR).

In a possible embodiment of the control apparatus according to the second aspect of the present invention the access restriction mechanism (AR) of said control apparatus comprises a mechanical access restriction mechanism (MAR) provided by an at least partially transparent protection cover adapted to cover access restricted human machine interface elements of the human machine interface, HMI.

In a possible embodiment of the control apparatus according to the second aspect of the present invention the protection cover of the mechanical access restriction mechanism (MAR) is sealable by a seal which can be broken by a user to get access to the access restricted human machine interface elements after the protection cover has been opened or removed by the user.

In a possible embodiment of the control apparatus according to the second aspect of the present invention the computer-implemented access restriction mechanism (SAR) of said control apparatus comprises an authentication mechanism executed by the processor of the control unit and used to perform user authentication of a user.

In a possible embodiment of the control apparatus according to the second aspect of the present invention the computer-implemented access restriction mechanism (SAR) comprises a challenge response authentication mechanism where the user is presented via the human machine interface, HMI, with a challenge and is successfully authenticated after having provided a valid response to the presented challenge via the human machine interface.

In a possible embodiment of the control apparatus according to the second aspect of the present invention setting values of operation parameters input by the user by means of human machine interface elements of the human machine interface, HMI, are automatically analyzed by a setting value user assistance algorithm (SUA) executed on a processor of a control unit of the control apparatus with respect to device characteristics of the at least one connected electrical device to check whether the input setting values of the operation parameter are admissible to enhance the operation security of the connected electrical devices and/or the operation security of the power distribution system and/or the operation security of the control apparatus.

In a possible embodiment of the control apparatus according to the second aspect of the present invention the input setting values of the operation parameters are found to be not admissible by the setting value user assistance algorithm (SUA) executed on the processor of the control unit if the analyzed setting values of the operation parameters input by the user are not within predefined admissible operation parameter ranges or are in conflict with setting values of other operation parameters.

In a possible embodiment of the control apparatus according to the second aspect of the present invention if the analyzed input setting values of the operation parameters are found to be admissible by the setting value user assistance algorithm (SUA) executed on the processor of the control unit a positive feedback signal, in particular a color-coded feedback signal, is output to the user by human machine interface elements of the human machine interface, HMI, indicating that the input setting values of the operation parameters are admissible and the corresponding operation parameters of the at least one connected electrical device are automatically adjusted accordingly by the control unit of the control apparatus.

In a possible embodiment of the control apparatus according to the second aspect of the present invention if the analyzed input setting values of the operation parameters are found to be not admissible by the setting value user assistance algorithm (SUA) executed on the processor of the control unit a negative feedback signal, in particular a color-coded feedback signal, is output to the user via the human machine interface elements of the human machine interface, HMI, indicating the inadmissibility of the previously input setting values of the operation parameters and/or a request to change the input setting values of the operation parameters is output via the human machine interface elements of the human machine interface of said control apparatus to the user and/or admissible operation parameter settings in particular operation parameter settings, inadmissible operation parameter ranges are suggested by the setting value user assistance algorithm (SUA).

In a possible embodiment of the control apparatus according to the second aspect of the present invention the setting value user assistance algorithm (SUA) executed on the processor of the control unit of said control apparatus is adapted to calculate and adapt automatically admissible operation parameter ranges for operation parameters of the at least one electrical device connected to said control apparatus depending on the type of the at least one connected electrical device, a monitored operation state of the at least one connected electrical device, an observed state of the power distribution system, sensor data received from sensors provided at the at least one connected electrical device, data exchanged with other control units via a data bus and/or depending on a required predefined operation security level.

In a possible embodiment of the control apparatus according to the second aspect of the present invention wherein a troubleshooting user assistance algorithm (TUA) executed on the processor of the control unit of said control apparatus is adapted to automatically provide troubleshooting assistance to the user in case of inadmissible setting values of the operation parameters and to control light signal sources indicating where a root cause for a detected operation fault is located.

In a possible embodiment of the control apparatus according to the second aspect of the present invention wherein operation faults occurring during operation of at least one electrical device connected to said control apparatus are displayed via the human machine interface, HMI, to the user and troubleshooting assistance to handle the displayed operation faults is provided by a troubleshooting user assistance algorithm (TUA) executed on the processor of the control unit of said control apparatus.

In a possible embodiment of the control apparatus according to the second aspect of the present invention the control apparatus comprises a wired or wireless bus interface to connect the control unit of the control apparatus to a data bus of the power distribution system through which control units of different control apparatuses of said power distribution system communicate with each other to exchange data.

In a possible embodiment of the control apparatus according to the second aspect of the present invention the power distribution system comprises busbars, rails or electrical wires adapted to distribute electrical power with the connected electrical devices.

In a possible embodiment of the control apparatus according to the second aspect of the present invention the control apparatus comprises an overcurrent protection circuit adapted to protect the connected electrical devices against overcurrents, an overload protection circuit adapted to protect the connected electrical devices against overload and/or a power supply control circuit adapted to control the power supply from the power distribution system to the connected electrical devices.

In a possible embodiment of the control apparatus according to the second aspect of the present invention the control apparatus further comprises a data interface used to connect a computer device to the control apparatus and/or comprises a wireless or wired interface used to connect a mobile user equipment to the control apparatus.

BRIEF DESCRIPTION OF FIGURES

In the following, possible embodiments of the different aspects of the present invention are described in more detail with reference to the enclosed figures.

FIG. 6 shows a flowchart for illustrating a possible exemplary embodiment of a computer-implemented method for adjusting operation parameters according to the second aspect of the present invention.

DETAILED DESCRIPTION OF EMBODIMENTS

Figure 1:
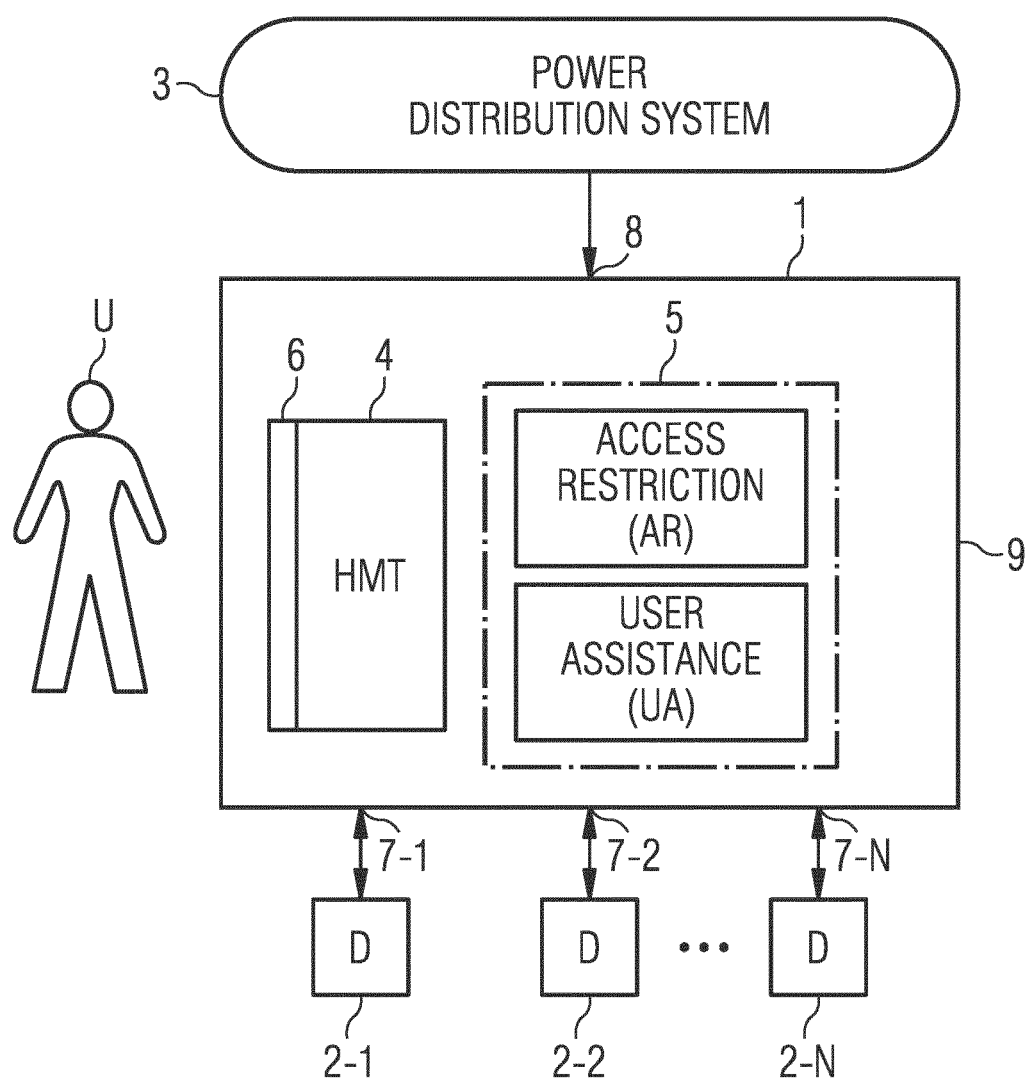
FIG. 1 shows a schematic diagram of a possible embodiment of an apparatus according to the first aspect of the present invention.

As can be seen in the schematic diagram of FIG. 1, an apparatus 1 according to an aspect of the present invention is provided to connect at least one device 2 to a common power distribution system 3. In the illustrated embodiment of FIG. 1, N devices are connected via the apparatus 1 to the power distribution system 3. The devices 2 can comprise loads which receive a power supply from the power distribution system 3. The devices 2 can for instance comprise motors connected via the apparatus 1 to the power distribution system 3.

The apparatus 1 comprises a human machine interface 4 having elements which can be used by a user U to interact with the apparatus 1 as illustrated in FIG. 1. The human machine interface elements of the human machine interface 4 are adapted to display and/or to adjust setting values of operation parameters of the at least one connected device 2.

Figure 4:
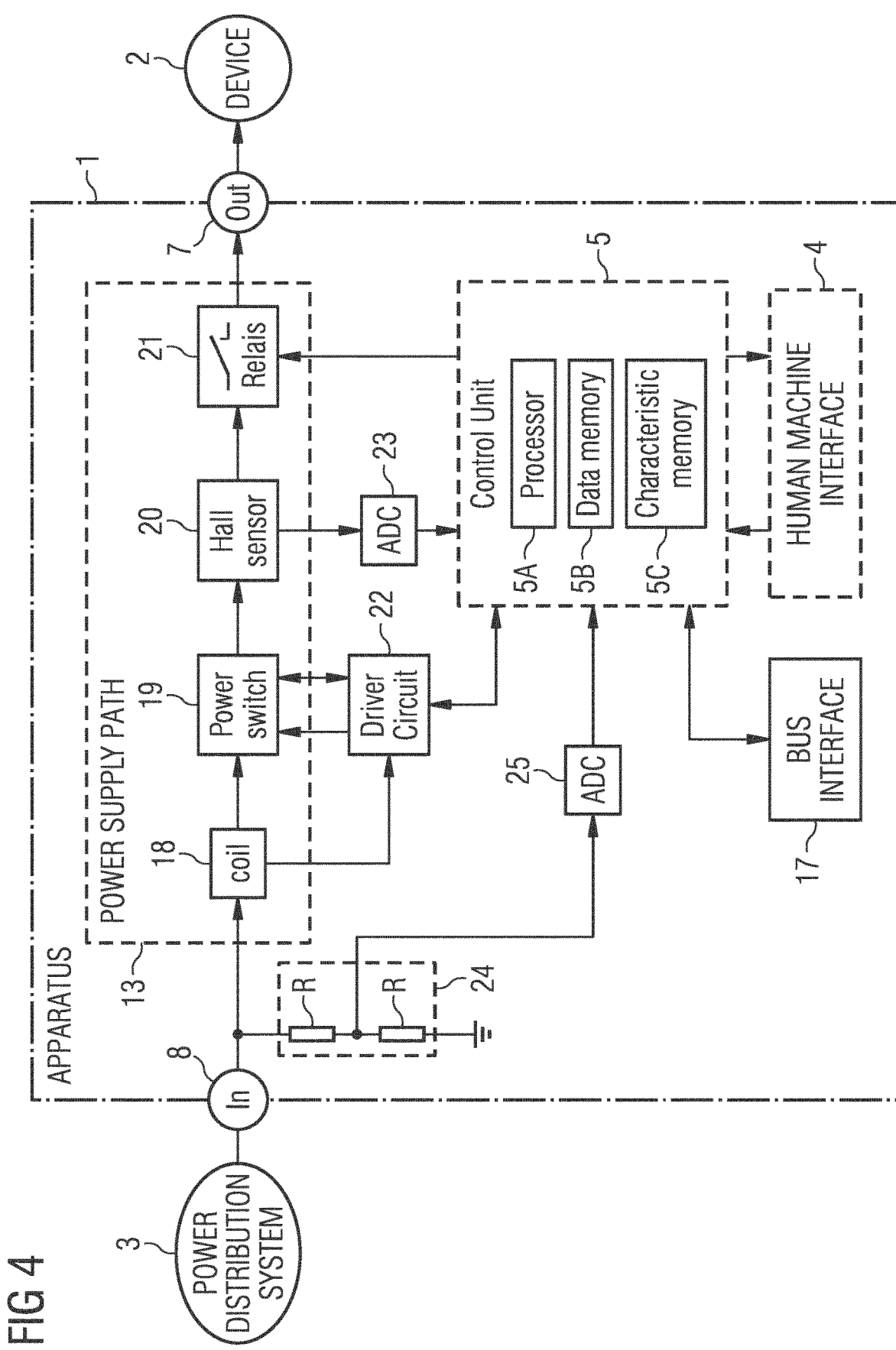
FIG. 4 shows a block diagram of a possible exemplary embodiment of an apparatus according to the first aspect of the present invention.

In the illustrated embodiment of FIG. 1, the apparatus 1 comprises a controller or control unit 5 having at least one processor 5A as shown in the exemplary embodiment of FIG. 4. The processor 5A of the control unit 5 is adapted to execute in a possible embodiment a computer-implemented access restriction mechanism which restricts the access to one or more human machine interface elements of the apparatus 1. This access restriction mechanism is adapted to enhance the operation security of the at least one device 2 such as a motor connected via the control apparatus 1 to the common power distribution system 3. The access restriction mechanisms can also be provided to enhance the operation security of the control apparatus 1 itself. Further, the access restriction mechanisms can be provided to enhance also the operation security of the power distribution system 3. Besides the computer-implemented access restriction mechanism, the apparatus 1 can further comprise in a possible embodiment a mechanical access restriction mechanism. This mechanical access restriction mechanism can be provided in a possible embodiment by a protection cover 6 adapted to cover human machine interface elements of the human machine interface 4. The protection cover 6 forming the mechanical access restriction mechanism may cover all or only portions of the human machine interface elements. In a possible implementation, the protection cover 6 can also be partially transparent so that display elements of the human machine interface 4 are visible to the user U but cannot be reached manually by the user U. The protection cover 6 of the mechanical access restriction mechanism can in a possible embodiment be sealable by a seal. The seal may be broken by a user U to get access, i.e. physical access with his/her fingers, to the access restricted human machine interface elements of the human machine interface 4 after the protection cover 6 has been opened or removed by the user U. The protection cover 6 can in an alternative embodiment also be locked up by a locking mechanism such as a key. Only a user U being in possession of the key may open the locking mechanism and open or remove the protection cover 6 of the human machine interface 4.

In the embodiment illustrated in FIG. 1, the apparatus 1 comprises both a mechanical access restriction mechanism implemented by the protection cover 6 and a computer-implemented access restriction mechanism being implemented and executable by a processor 5A of the control unit 5.

In an alternative embodiment, the apparatus 1 may comprise only a mechanical access restriction mechanism such as a protection cover 6.

In a still further embodiment of the apparatus 1 according to the present invention, the apparatus 1 may comprise only a computer-implemented access restriction mechanism.

The computer-implemented access restriction mechanism in any of the above mentioned alternative embodiments can comprise in a possible implementation a challenge response authentication mechanism where the user U is presented via the human machine interface 4 with a challenge and is successfully authenticated after having provided a valid response to the presented challenge via the human machine interface 4. The challenge response mechanism can be implemented in different ways. In a simple implementation, the user U can be requested to input a PIN number or a password. In other implementations, the challenge can also be an inquiry expecting a certain expert knowledge of the user about the affected system. The challenge response authentication mechanism can also comprise an interaction between a token carried by the user U and a reading device of the apparatus 1. If the user U is in possession of the token he is successfully authenticated and access to some or all human machine interface elements of the human machine interface 4 is granted. The human machine interface 4 forms the user interface or dashboard and allows interaction of the user U or person with the apparatus 1 and/or with at least one of the connected devices 2. The human machine interface 4 may also allow interaction of the user U and a controller 5 of the power distribution system 3. In a possible embodiment, the human machine interface 4 may comprise different kinds of human machine interface elements. These human machine interface elements can comprise in a possible implementation manually activated switches, diodes or other electrical control elements. Human machine interface elements can also comprise display elements or other output elements such as acoustic output elements. Human machine interface elements can also comprise touch-sensitive display elements or graphical user interface elements. In the illustrated embodiment of FIG. 1, at least the security- or safety-relevant human machine interface elements can be covered by the transparent protection cover 6. Only a successfully authenticated user U or a user being in possession of a corresponding token gets access with his hands to the access restricted human machine interface elements. In a possible embodiment, the human machine interface 4 may comprise a graphical user interface GUI. The human machine interface 4 can be used to visualize and display data related to the connected devices 2 and/or to the operation of the power distribution system 3. Human machine interface elements can comprise elements which a person or user can touch, see or use to perform control functions and receive a feedback from those actions.

The computer-implemented software based access restriction mechanism (SAR) and the mechanical access restriction (MAR) mechanism as e.g. provided by the protection cover 6 can in a possible embodiment be linked to each other. In an embodiment, the computer-implemented access restriction mechanism (SAR) which may comprise a challenge response process which can be performed by means of input and output human machine interface elements 12-$i$ of the human machine interface 4 through the transparent protection cover 6 to check whether the user U can be successfully authenticated by means of the computer-implemented access restriction mechanism (SAR). Only after the user U has been successfully be authenticated by the computer-implemented access restriction mechanism (SAR), a mechanical access restriction mechanism (MAR) becomes available to the user U such as a mechanical lock or a mechanical seal. For instance, after successful authentication of the user U by the computer-implemented access restriction mechanism (SAR), a cover plate in the housing 9 of the apparatus 1 can be opened or removed providing access to a keyhole for a mechanical key. In this implementation, the user U can then insert a mechanical key into the keyhole and get access through this mechanical access restriction mechanism (MAR) of the apparatus 1. In this embodiment, the authentication encompasses both a software-implemented authentication and a mechanical authentication of the user U. This increases the operation security of the system, in particular of the connected devices 2.

The computer-implemented software based access restriction mechanism (SAR) can comprise also other authentication mechanisms, in particular biometric authentication (e.g. fingerprint authentication) or voice recognition of a user. In this embodiment the HMI 4 comprises sensor elements such as touch sensitive surfaces or a microphone. Any kind of biometric feature of a user can detected and processed for authentication of a user.

Authenticated users may also get automatically different assigned rights to perform adjustments concerning the connected devices 2. For example, if the authenticated user belongs to a first skilled group he may perform adjustments of critical parameters whereas if the authenticated user belongs to another unskilled group he may perform only adjustments of less critical parameters.

In a possible embodiment of the apparatus 1 as illustrated in FIG. 1, setting values of operation parameters input by the user U by means of human machine interface elements of the human machine interface 4 are automatically analyzed by a user assistance algorithm executed on a processor 5A of the control unit 5 of the apparatus 1. The setting values of the operation parameters input by the successfully authorized user U can be analyzed in a possible embodiment automatically with respect to device characteristics of the at least one connected device 2 to check whether the input setting values of the operation parameter are admissible. Only if the input setting values of the operation parameter are admissible, an automatic adjustment of the operation parameter of the respective connected device 2 is performed by the control unit 5 of the apparatus 1. Each device 2-*i* can be connected via a control and data interface 7 to the apparatus 1. The apparatus 1 further comprises at least one input terminal 8 for connection to the power distribution system 3. In a possible implementation, the apparatus 1 comprises three input terminals for connection to three different current phases L1, L2, L3 of the power distribution system 3. The device characteristics of the at least one connected device 2 can be stored in a possible embodiment in a local characteristic memory 5C of the apparatus 1. In a possible alternative embodiment, the device characteristic of the device 2 is fetched from a local memory of the connected device 2 via the interface 7 and stored in a memory of the apparatus 1 for further processing. In a possible implementation, a handshake mechanism is implemented by a protocol between the apparatus 1 and the device 2 for detecting a type of the connected device 2 and/or for fetching specific device characteristics from a memory of the device 2 to be loaded into the local device characteristic memory 5C of the apparatus 1. The user assistance (UA) algorithm executed on a processor 5A of the control unit 5 can process the preconfigured or loaded device characteristics of the connected device 2 to check automatically whether the input setting values of the operation parameter are admissible. For example, the user assistance algorithm (SUA) can evaluate the setting values to check whether the setting values of the operation parameter are in an admissible range. The input setting values of the operation parameters are found to be not admissible by the executed user assistance algorithm, if the analyzed setting values of the operation parameters input by the user U via the human machine interface 4 are not within predefined admissible operation parameter ranges. Further, the input setting values of the operation parameters are found to be not admissible by the executed user assistance algorithm, if the input setting values are in conflict with setting values of other operation parameters.

In case that the analyzed input setting values of the operation parameters are found to be not admissible by the user assistance algorithm executed on the processor of the control unit 5, a feedback signal, in particular a color-coded feedback signal, is output to the user U via the human machine interface elements 12-*i* of the human machine interface 4 indicating the inadmissibility of the input setting values of the operation parameters.

Further, in a possible embodiment, if the analyzed input setting values of the operation parameters are found to be not admissible by the user assistance algorithm executed on the processor 5A of the control unit 5, a request to change the previously set input setting values of the operation parameters can be output via human machine interface elements such as display elements of the human machine interface 4 of the apparatus 1 to the respective user U. The request may include a statement that asks the user U to change the operation parameter setting of the respective parameter and may output a color-coded feedback signal (e.g. a feedback signal in red color) making the user U aware of the inadmissibility of previously set operation parameter values. The color-coded feedback signal can also encode how critical the respective operation parameter is for the operation of the system or connected device 2, e.g. yellow for moderate critical (e.g. warning) and red for very critical (error, fault, critical operation state, emergency). The encoding of the feedback signal can be performed in different ways. For instance, the feedback signal can also comprise pulses having a frequency corresponding to the relevance of the operation parameter for the security of the operated system.

In a possible embodiment, the user assistance algorithm (SUA) executed on the processor 5A of the control unit 5 of the apparatus 1 is further adapted to calculate and adapt automatically admissible operation parameter ranges or operation parameters of the at least device 2 connected to the apparatus 1 depending on an input or detected type of the at least one connected device 2. Further, the user assistance algorithm can also calculate and adapt the admissible operation parameter ranges depending on a monitored operation state of the at least one connected device 2 and/or an observed state of the power distribution system 3. In a further embodiment, sensor data is received from sensors provided at the at least one connected device 2 and processed by the user assistance algorithm to calculate admissible operation ranges of operation parameters of the at least one connected device 2 depending on the processed sensor data. The sensor data may comprise for instance current data, voltage data, power data and/or environmental data such as temperature data indicating the temperature of components of the connected devices 2 or the environmental temperature around the devices 2. In a further possible embodiment, the user assistance algorithms performed by the control unit 5 of the apparatus 1 can also process data exchanged with other control units 5 of other similar apparatuses 1 via a data bus of the system. In a still further possible embodiment, the user assistance algorithm executed on the processor of the control unit 5 can also calculate admissible operation ranges for operation parameters depending on a required predefined operation security level. The operation security level can be preconfigured or can be input by the user U via the human machine interface 4.

Further, the user assistance algorithm executed on the processor 5A of the control unit 5 can comprise a troubleshooting user assistance algorithm (TUA) be adapted to provide automatically troubleshooting assistance to the user U in case of inadmissible setting values of the operation parameters. For instance, the user assistance algorithm can provide specific tips for performing a structured troubleshooting in case that set operation parameter values are not in an admissible parameter range.

In a further preferred embodiment, the user assistance algorithm can also perform automatically a fault analysis to find a cause why the parameter settings performed by the user U via the human machine interface 4 are not in an admissible parameter range. For instance, the current operation state of at least one of the connected devices 2 may narrow down the operation range of specific operation parameters to such an extent that the operation parameter setting which in a normal state of the device 2 was still valid is no longer within an admissible range. In this embodiment, the user assistance algorithm can indicate via the human machine interface 4 to the user U the specific observed state of the connected device 2 or the specific observed state of the power distribution system 3 having narrowed down the admissible range of the set operation parameter. The user assistance algorithm can provide a structured handshake interaction to identify a cause for an invalid input parameter setting. In a further possible embodiment, the user assistance algorithm can also analyze a detected and notified error of a connected device 2 such as an engine or motor and can pass the corresponding data to the user U via the human machine interface 4.

In a possible embodiment, the user assistance algorithm can also provide additional information or advice how to handle a specific observed state of the connected device 2, in particular how to readjust or to reset other operation parameters in the detected situation to increase security of the connected device and/or other devices 2 connected to the apparatus 1 and the operation security of the power distribution system 3.

In a possible embodiment, the user assistance algorithm checks for plausibility of input operation parameters and gives a corresponding feedback, in particular a color-coded feedback to the user U via the human machine interface 4. For instance, if the connected device 2 comprises an electrical motor, the computer-implemented access restriction mechanism sets only safe operation parameters which have been found to be in admissible operation parameter ranges. The trouble shooting user assistance algorithm (TUA) can in a possible embodiment control the display of color-coded feedback signals output by human machine interface elements 12-1 of the HMI 4, in particular the LEDs 12-6, 12-7 shown in FIG. 2.

If the analyzed input setting values of the operation parameters are found to be admissible by the setting value user assistance algorithm (SUA)executed on the processor 5A of the control unit 5, a further feedback signal, in particular a color-coded feedback signal, is output to the user U by the human machine interface elements of the human machine interface 4 indicating that the input setting values of the operation parameters are admissible and the corresponding operation parameters of the at least one connected device 2 are automatically adjusted accordingly by the control unit 5 of the apparatus 1. The feedback signal can be a color-coded feedback signal such as a green signal indicating that the analyzed input setting values of the operation parameters are found to be admissible by the user assistance algorithm, for instance if the operation parameters are in an admissible operation parameter range.

In a further possible embodiment of the apparatus 1 as illustrated in FIG. 1, the apparatus 1 can also comprise a bus interface 17 which can be used to connect the control unit 5 of the apparatus 1 to a data bus 26 of the power distribution system 3 as also explained in more detail with reference to the embodiment illustrated in FIG. 5. The data bus 26 of the power distribution system 3 may be provided to provide communication between the control units 5 of different apparatuses 1 connected to the power distribution system 3. The data bus 26 can be provided to exchange data between the different control units 5 and/or to exchange control signals between the different control units 5.

The power distribution system 3 as shown in FIG. 1 can comprise busbar rails or electrical wires adapted to distribute electrical power to the connected device 2 via the apparatus 1. In a possible embodiment, the apparatus 1 can comprise different circuits, in particular circuits used to connect the at least one connected device 2. In a possible embodiment, the apparatus 1 comprises an overcurrent protection circuit adapted to protect the connected devices 2 against over currents. The apparatus 1 can further comprise an overload protection circuit adapted to protect the connected devices 2 against overload. The apparatus 1 can also comprise a power supply control circuit adapted to control the power supply from the power distribution system 3 to the connected devices 2.

Figure 2:
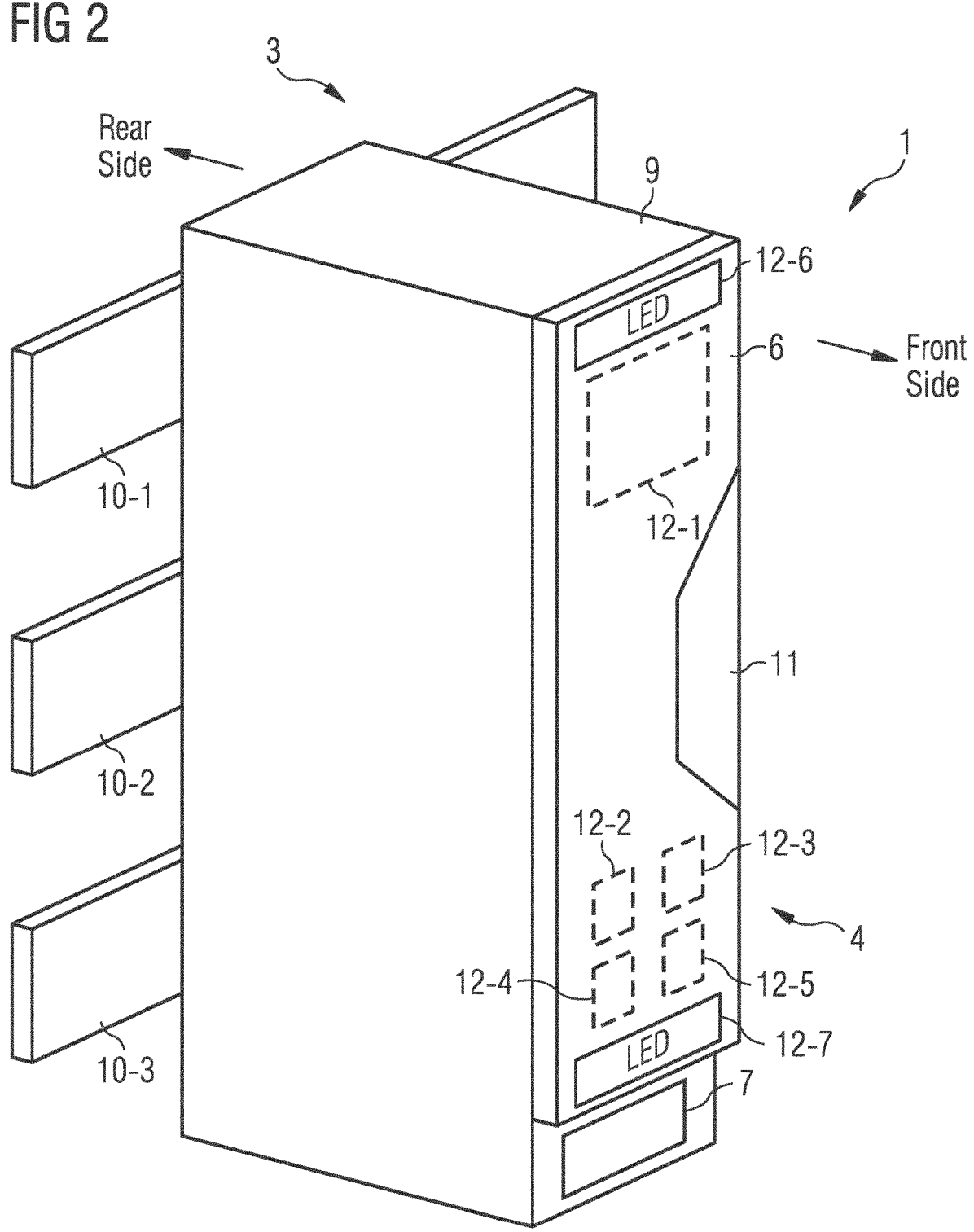
FIG. 2 illustrates a possible exemplary embodiment of an apparatus according to the first aspect of the present invention.

FIG. 2 shows an exemplary embodiment of an apparatus 1 according to the first aspect of the present invention. The control apparatus 1 as shown in the embodiment of FIG. 2 comprises a housing 9 having a front side and a rear side. The rear side of the apparatus 1 comprises an interface 8 for connecting the apparatus 1 to the power distribution system 3. In the illustrated embodiment, the power distribution system 3 comprises three busbars 10-1, 10-2, 10-3 for different electrical phases L of a power supply network. At the front side, the apparatus 1 comprises a human machine interface 4 having different human machine interface elements 12. A portion of the human machine interface elements 12 of the human machine interface 4 is covered in the illustrated embodiment by a transparent protection cover 6. In the illustrated embodiment of FIG. 2, at least one specific human machine interface element 11 is not covered by the protection cover 6 as shown in FIG. 2. The uncovered machine interface element 11 shown in FIG. 2 may be used to navigate through a displayed menu. The machine interface element 11 can comprise a key element or button with an integrated LED. The machine interface element 11 can comprise a touch display element. Other human machine interface elements 12 are covered by the transparent protection cover 6. For instance, the human machine interface 4 can comprise a display element 12-1 as shown in FIG. 2. This display element 12-1 may display a menu of operation parameters to a user through the transparent protection cover 6 of the human machine interface 4. The display unit 12-1 can comprise a touch sensitive display unit. For instance, there can be provided a hierarchy of parameters within a tree structure. By interacting with the menu, a user U can navigate to a specific operation parameter whose setting he wants to change. The navigation of the operation parameter can be performed in a possible embodiment by the human machine interface element 11 which is not covered by the protection cover 6. The protection cover 6 forms a mechanical access restriction mechanism MAR allowing access for the user U only to a portion of the available human machine interface elements such as the mechanical input element 11. The input element 11 can be a button element which can be pressed by the user U manually to navigate through the displayed menu visible to him through the transparent protection cover 6. After having reached the desired operation parameter for changing its setting value access to a required human machine interface element for performing the adjustment of the setting value has to be achieved by the user U by passing at least one access restriction mechanism. This access restriction mechanism can in a possible embodiment comprise a physical or mechanical access restriction mechanism (MAR) provided by the transparent protection cover 6 locked by a seal or mechanical key. In a possible embodiment, if the user U breaks the seal he can open or remove the transparent protection cover 6 and gets access to at least one access restricted human machine interface element of the human machine interface 4, for instance to the human machine interface elements 12-2 to 12-5 as shown in FIG. 2. By handling the human machine interface elements 12-2 to 12-5 comprising e.g. buttons, the user U has then the possibility to change the operation setting values of the operation parameter to which he has arrived through the menu button 11. The human-machine interface elements 12-2- to 12-5 can comprise touch display elements or buttons with integrated light signal sources. FIG. 2 also shows un upper light signals source 12-6 and a lower light signal source 12-7 as interface elements of the HMI 4. These light signal sources 12-6, 12-7 can be used to provide color coded signals providing assistance to a user to find a root cause for a detected technical problem such as a detected short circuit. The light signal sources 12-6, 12-7 can comprise LEDs. In other embodiments the light signal sources 12-6, 12-7 can comprise OLED or optical fibres. The position of the light signal sources 12-6, 12-7 may vary depending on the use case. They can be provided at the front face of the HMI 4 but also on other surfaces of the housing 9, in particular on the top surface or bottom surface in the mounted state of the apparatus 1 as illustrated in FIG. 2.

The human machine interface elements 12-i of the HMI 4 may vary depending on the use case and may comprise e.g. also potentiometers or DIP switches.

In a possible embodiment the housing 9 is made of a transparent or semi-transparent material which allows light signals to pass through. In this embodiment the light emitting signal sources such as LEDs of the HMI 4 can be integrated within the housing 9 of the apparatus 1.

In a further embodiment the apparatus 1 is not connected to busbars 10 as illustrated in FIG. 2 but does comprise a power supply input connector socket to receive a plug-in power supply connector for connection to a power distribution system 3. This socket can for instance be provided at the top side of the housing 9 when mounted to a mounting plate.

In a further embodiment, the apparatus 1 comprising a sealed transparent protection cover 6 provides only information which is visible to the user U. Only when the protection cover 6 has been opened, i.e. as seal has been broken, a user U can navigate in a possible embodiment to the displayed settings. In this alternative embodiment, a user U gets only access to the menu button 11 after having broken the seal of the protection cover 6. In this embodiment, the menu button 11 is beneath the transparent protection cover 6 of the human machine interface 4. The breaking of a seal can also involve a warning message or signal output to the user U via a display element of the human machine interface 4.

In the illustrated embodiment of FIG. 2, the apparatus 1 comprises an interface 7 for connecting a device 2 such as a motor to the apparatus 1. In the illustrated embodiment, this device interface 7 is located on the front side of the housing 9 of the apparatus 1 as shown in FIG. 2. In further embodiments, the housing 9 may comprise several device interfaces 7 at the front side of the housing 9. On the backside of the housing 9, the apparatus 1 comprises interface elements for providing an electrical connection to the different busbars 10-1, 10-2, 10-3 of the illustrated power distribution system 3. In a possible embodiment, the busbars 10-i can also comprise slots for inserting electrical contacts of the apparatus 1 for providing electrical connection to the power distribution system 3.

The device or load 2 is connected in a preferred embodiment by means of a device interface 7 located at the bottom or lower side of the housing 9 of the apparatus 1 as also illustrated in FIG. 2. In a possible embodiment at the front side of the housing the human machine interface HMI 4 has additional display elements such as LEDs 12-6, 12-7 supporting the user in finding root causes for failures and providing assistance in performing troubleshooting.

In a possible embodiment the human machine Interface 4 comprises a first LED 12-6 at the top of the human machine interface 4 a second LED 12-7 at the bottom or lower side of the human machine interface 4, e.g. close to the device interface 7 shown in FIG. 2.

In a possible embodiment the first LED 12-6 at the top of the HMI 4 provides a color-coded indication that a fault has occurred relating to the input side of the apparatus 1, i.e. to the side of the power distribution system 3. In contrast the second LED 12-7 at the bottom of the HMI 4 provides a color-coded indication that a fault has occurred relating to the output side of the apparatus 1, i.e. to the at least one device interface 7 of the apparatus 1.

For example, if a device related short circuit does occur the second LED 12-7 located close to the corresponding device interface 7 of the affected device 2 can provide a red warning signal indicating a malfunction or fault concerning the connected device 2. The short circuit detection is performed by the measurement circuitry of the apparatus 1 including e.g. the coil 18 illustrated in the embodiment of FIG. 4. Further a symbol can be displayed on the display unit 12-1 of the HMI 4 symbolizing the respective fault, e.g. a short circuit symbol. Moreover, the display unit 12-1 can display a list of possible causes for short circuit faults on the load side of the apparatus 1 and can display also handling instructions for the user how to handle this situation. For example, the display unit 12-1 of the HMI 4 may display an instruction to the user "Check the connection cable of the device for a possible short circuit".

However, if a fault relates to the input side of the apparatus 1 the first LED 12-6 at the top of the HMI 4 may provide a red warning signal. If for instance a DC supply voltage is supplied to the control unit 5 of the apparatus 1 from the input side, e.g. via the bus interface 17 shown in FIG. 5 and fails or is reduced e.g. from a set voltage of 24 Volts to a lower insufficient voltage of e.g. 19 Volts the first LED at top of the HMI 4 provides a red warning signal making the user aware about the fact that whatever technical problem has occurred the fault can be found on the input side of the apparatus 1, i.e. the side facing the power distribution system 3. In this example the display unit 12-1 of the HMI 4 can also show a symbol for an insufficient DC supply voltage and output a message or advice how to handle this fault.

Also an acoustic feedback or even an acoustic assistance message for the user with specific instructions can be output via a loudspeaker of the HMI 4 to support him in finding and overcoming a fault related to the distribution system 3, the apparatus 1 itself or related to a device 2 connected to the apparatus 1.

As soon as the fault has been fixed by the user the corresponding LED 12-6, 12-7 at the HMI 4 can switch from a red color-coded warning signal back to a green color-coded signal indicating a fault free operation state.

In a possible embodiment each device interface 7 comprises an associated LED 12-7. This facilitates finding a root cause concerning a malfunction of one connected device 2 within a group of connected devices 2.

The apparatus 1 comprises in a possible embodiment a data interface, in particular a USB interface, used to connect a computer device to the apparatus 1. This computer device can run a service software tool adapted to display a virtual apparatus 1 on the screen of the computer device including its human machine interface elements 11, 12-i.

The apparatus 1 can also comprise a wireless interface to link a computer implemented application run on a mobile phone to the apparatus 1. This application can comprise a service application providing service functions related to the connected devices 2.

Figure 3:
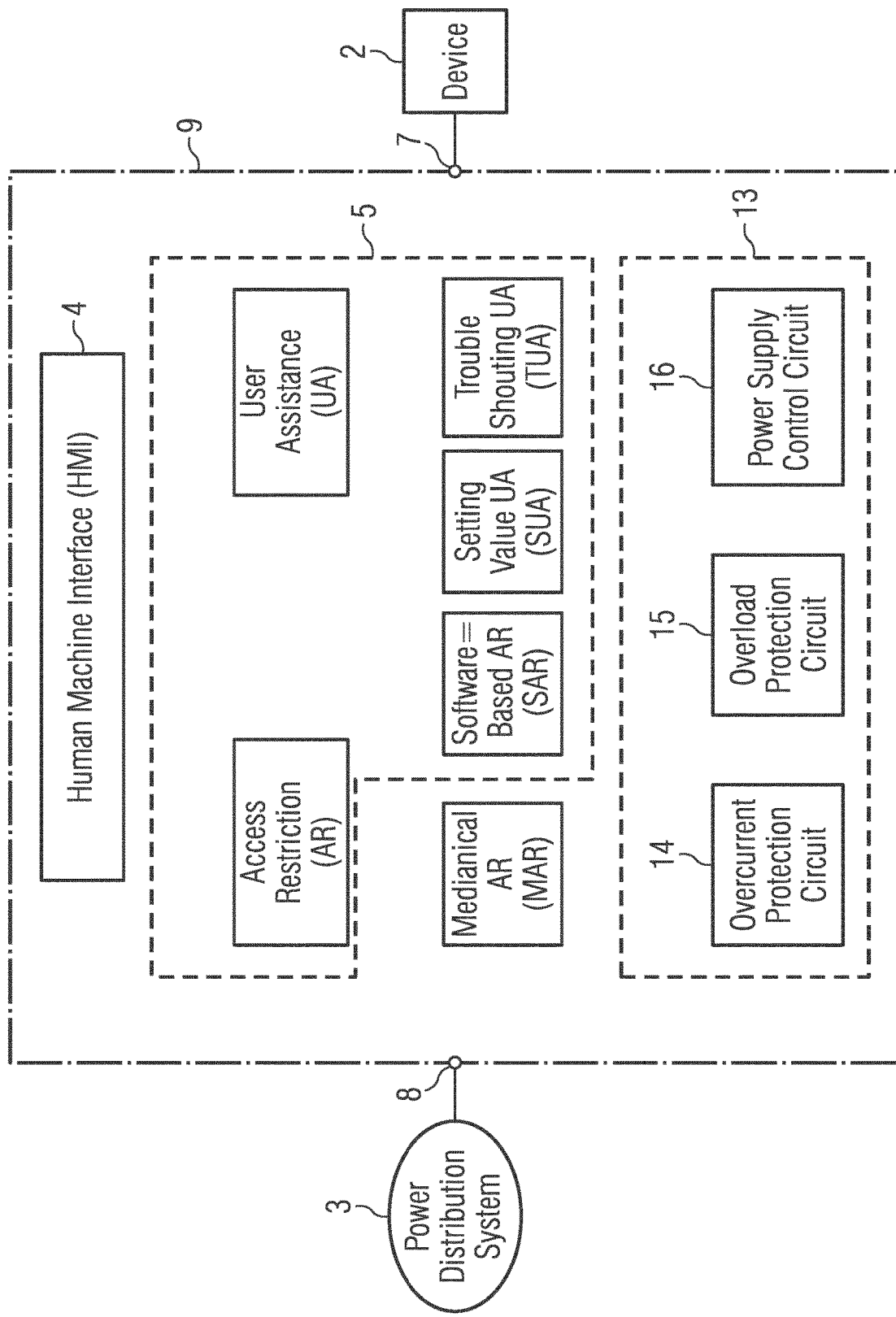
FIG. 3 shows a block diagram for illustrating a possible exemplary embodiment of an apparatus according to the first aspect of the present invention.

FIG. 3 shows a further block diagram for illustrating a possible exemplary embodiment of an apparatus 1 according to the first aspect of the present invention. In the illustrated embodiment, the apparatus 1 comprises a power supply path 13 between the power distribution system 3 and the connected device 2. In the illustrated embodiment, the power supply path 13 comprises an overcurrent protection circuit 14, an overload protection circuit 15 and a power supply control circuit 16. The device 2 can comprise in a possible embodiment an inductive load such as a motor. The device 2 can also comprise a capacitive load or a resistive load or a combination of them. The electrical load consumes electrical energy in the form of electrical currents and can transform this electrical energy into other forms like heat, light, work, etc. The input terminal 8 of the apparatus 1 can be connected in a possible Instead of busbars, also other electrical carrying profiles can be used. Current-carrying rails or busbars can extend in horizontal or vertical direction, for instance in a switching cabinet. The apparatus 1 as illustrated in FIG. 1 can comprise a single or several power supply paths 13 with different electrical phases of the power distribution system 1.

The control unit 5 shown in FIG. 3 has a processor or computer provided for providing user assistance (UA) to the user by means of the HMI 4. The user assistance (UA) comprises computer implemented setting value assistance (SUA) procedures as well as computer implemented troubleshooting assistance (TUA) procedures. Troubleshooting involves fault detection, root cause analysis and generation of suggestions to overcome the detected faults. The access restriction (AR) can be mechanical (MAR) or software-based including computer-implemented software based access restriction procedures (SAR).

FIG. 4 illustrates a possible embodiment of an apparatus 1 comprising a human machine interface 4 which can be used to connect at least one device 2 to a power distribution system 3. In the illustrated embodiment of FIG. 4, the apparatus 1 comprises a control unit 5 having at least one processor 5A, a data memory 5B and a characteristic memory 5C. The control unit is connected to a human machine interface 4 having human machine interface elements used by a user U to interact with the apparatus 1. The human machine interface elements of the human machine interface 4 as shown in FIG. 4 are adapted to display and/or to adjust setting values of operation parameters of the at least one connected device 2. Access to the human machine interface elements is restricted by at least one access restriction mechanism. This access restriction mechanisms can comprise a mechanical access restriction mechanism MAR such as a cover plate 6 or a software-based computer-implemented access restriction mechanism SAR executed on the processor aA of the control unit 5.

In the illustrated embodiment of FIG. 4, the apparatus 1 further comprises a bus interface 17 which is also connected to the control unit 5. The bus interface 17 is provided to connect the control unit 5 of the apparatus 1 to a data bus 26 of the power distribution system 3. The data bus 26 can be used for communication between different control units 5 of different apparatuses 1 connected to the power distribution system. Also, data such as sensor data can be exchanged via this data bus 26 by means of the bus interface 17.

As can be seen in FIG. 4, the power supply path 13 comprises a sensor component 18 such as a coil connected in series with a power switch 19, a load current sensor component 20 and a relay 21. The sensor component 18 is adapted to generate directly a voltage drop corresponding to a current rise speed of the electrical load current flowing from the input terminal 8 of the control apparatus 1 via the power supply path 13 to the output terminal 7 of the control apparatus 1. The overcurrent protection circuit 14 illustrated in the block diagram of FIG. 3 includes the power switch 19 from which the electrical device 2 receives the electrical load current and the sensor component 18 is connected in series with the power switch 19. The overcurrent protection circuit 14 further comprises a driver circuit 22 adapted to detect an occurring overcurrent depending on the voltage drop generated by the sensor component 18 and a voltage drop along the power switch 19. The voltage drop generated by the sensor component 18 and the voltage drop along the power switch 19 is applied to the driver circuit 22 as a sum voltage. The hardwired driver circuit 22 is adapted to switch off the power switch 19 automatically upon detection of an overcurrent with a switch-off period of less than five microseconds. This short switch-off period corresponds to the signal delays caused by the hardware components within the hardwired driver circuit 22 such as logic gates or comparators and by signal lines connecting the sensor component 18 to the driver circuit 22 as well as signal lines connecting the driver circuit 22 to the power switch 19. The non-linear voltage drop on the power switch 19 is used as a value representative of the momentary current in the sum voltage applied to an input pin of the driver circuit 22 integrated in a driver chip. Accordingly, the protected switch-off is responsive to a combination of both the value of the electrical current and to the value of the rate of the change of the electrical current flowing through the power supply path 13.

The overload protection circuit 15 illustrated in the block diagram of FIG. 3 comprises the sensor component 20 such as a Hall sensor adapted to measure continuously the load current flowing from the input terminal 8 to the output terminal 7. The measured load current is notified by the sensor component 20 to the control unit 5 of the apparatus 1 which is adapted to determine an overload state of the electrical load 2 on the basis of the measured load current profile. The control unit 5 is further adapted to control the driver circuit 21 to switch off the power switch 19 automatically if an overload state of the electrical load or device 2 has been determined by the control unit 5. In the implementation shown in FIG. 4, the sensor component 20 of the overload protection circuit 15 is connected to an associated analog-to-digital converter 23. The analog-to-digital converter 23 is adapted to convert the measured analog load current profile received from the Hall sensor 20 to corresponding measurement values or samples which can be stored temporarily in the data memory 5B of the control unit 5 for further processing.

The apparatus 1 comprises in the illustrated embodiment a further sensor component 24 formed by a voltage divider adapted to supply a fraction of the supply voltage at the input terminal 8 of the apparatus 1 to provide a supply voltage profile over time. The sensor component 9 is connected via an analog-to-digital converter 25 to the control unit 5 as shown in FIG. 4. The measurement values provided by the analog-to-digital converters 23, 25 are stored as data samples in the data memory 5B of the control unit 5 as load current profile data and as supply voltage profile data.

The control unit 5 of the apparatus 1 according to the present invention further comprises a memory 5C used to store different load operation characteristics of devices 2.

In a possible embodiment, setting values of operation parameters input by the user U by means of the human machine interface elements of the human machine interface 4 are automatically analyzed by a user assistance algorithm executed on the processor 5A of the control unit 5 of the apparatus 1 with respect to device characteristics of the at least one connected device 2 to check whether the input setting values of the operation parameter are admissible. In a possible embodiment, these device characteristics can be read from the characteristic memory 5C of the control unit 5.

The power supply control circuit 16 illustrated in the block diagram of FIG. 3 comprises a sensor component 24 adapted to measure at the input terminal 8 of the apparatus 1 a supply voltage notified to the control unit 5 of the apparatus 1. The control unit 5 can be adapted to control the electrical power supplied to the electrical device 2 depending on a type and/or depending on a current operation mode of the connected electrical device 2. The type of the electrical device can comprise a resistive, inductive or capacitive load type. Accordingly, the apparatus 1 illustrated in the implementation of FIG. 4 implements an overcurrent protection, an overload protection and/or a power supply control for the connected device 2.

Figure 5:
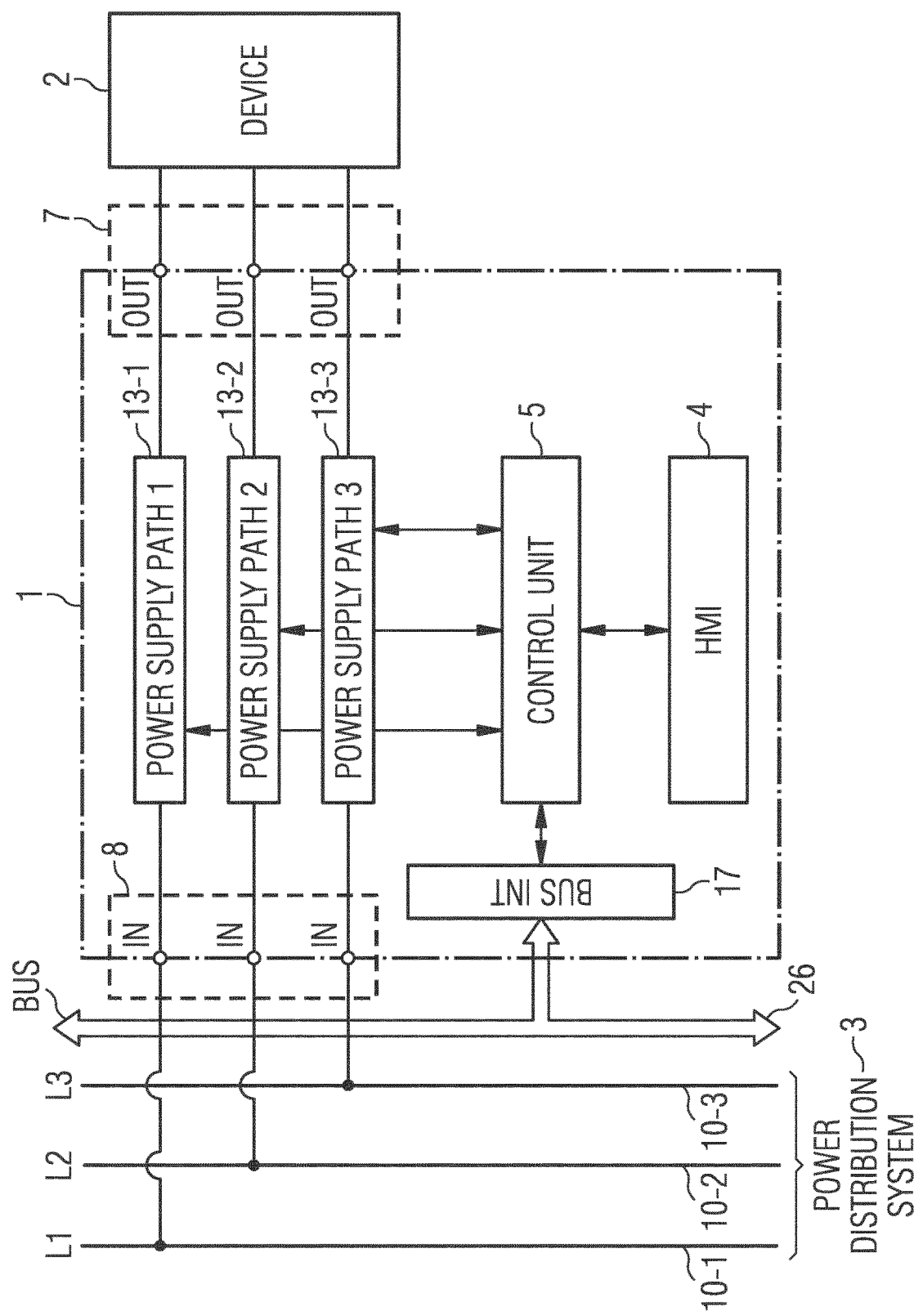
FIG. 5 shows a further block diagram for illustrating a possible exemplary embodiment of an apparatus according to the first aspect of the present invention.

FIG. 5 shows a further block diagram for illustrating a possible exemplary embodiment of an apparatus 1 according to the first aspect of the present invention. In the illustrated embodiment, the power distribution system 3 comprises three busbars or other electrically conductive rails 10-1, 10-2, 10-3 for three different electrical phases L1, L2, L3. For each electrical phase, a corresponding power supply path 13-1, 13-2, 13-3 is provided used to connect the device 2 to the power distribution system 3. The operation of the power supply paths 13-1, 13-2, 13-3 is controlled internally by a processor 5A of the control unit 5 as also described in context with FIG. 4. The control unit 5 is connected also to a bus interface 17 connected to a data bus 26 of the power distribution system 3 as shown in FIG. 5. Accordingly, the control unit 5 shown in FIG. 5 can communicate via the bus interface 17 with other control units 5 of similar control apparatuses 1 connected also to the power distribution system 3. The data bus 26 can comprise one or more data lines to exchange data. The bus 26 may also comprise control lines to exchange communication or control signals between the processors 5A of the different control units 5 connected to the power distribution system 3. The control and data bus 26 can also be connected to a remote or external controller of the power distribution system 3. The control unit 5 shown in the block diagram of FIG. 4 can comprise at least one processor 5A adapted to execute the computer-implemented access restriction mechanism (SAR). In a possible embodiment, the access restriction mechanism executed on the processor 5A can communicate via the data bus with the remote controller and/or with other access restriction mechanisms implemented in other control apparatuses 1 connected to the power distribution system 3. In a possible implementation, access to one or more human machine interface elements of the human machine interface 4 is granted by the access restriction mechanism implemented in the control unit 5 only after having received an enable signal from the remote controller of the power distribution system 3. In this embodiment, the remote controller or central control unit of the power distribution system 3 can first enable the distributed access restriction mechanisms implemented on the control unit 5 of the different apparatuses 1 before access can be granted, for instance by means of a local challenge response authentication mechanism performed via the human machine interface 4 of the apparatus 1. Further, the executed access restriction mechanism may also notify the remote central controller of the power distribution system 3 about a successful or failed authentication of a user U.

FIG. 6 shows a flowchart to illustrate an exemplary embodiment of a computer-implemented method according to the present invention.

In a first step S1, a user U performs an operation parameter setting with at least one operation parameter related to the connected device 2. In a further step S2, it is checked whether the operation parameter setting of the device 2 input in step S1 by the user U by means of a human machine interface element of the human machine interface 4 is relevant for the security or safety of the system, i.e. relevant for the security or safety of the connected device 2 or the control apparatus 1 itself and/or for the security and/or safety of the power distribution system 3.

If this is the case, a user authentication is performed in step S3. In case that the operation parameter setting performed by the user U in step S1 is not security- or safety-relevant, an automatic adjustment of the operation parameter setting is performed by the control unit 5.

In step S5, it is checked whether the user authentication has been performed successfully or not. If the user U cannot be successfully authenticated by the authentication mechanism executed by the processor 5A of the control unit 5, the operation parameter settings performed by the user U via the human machine interface 4 are blocked or suppressed so that no physical adjustment of the corresponding operation parameter is allowed and performed as illustrated by step S7 in the flowchart of FIG. 6.

On the contrary, if the user U can be successfully authenticated, the parameter setting of the security-relevant operation parameter input by the authenticated user U is evaluated in step S6 to determine in step S7 whether the input operation parameter setting is admissible or not.

If the evaluated operation parameter setting of the security-relevant operation parameter input by the authenticated user U is found to be admissible in step S8, an automatic adjustment corresponding to the input operation parameter setting is performed to physically change the corresponding operation parameter in step S9. Further, a positive feedback signal is provided to the user U via display elements of the human machine interface 4, in particular a color-coded feedback signal (for instance a green feedback signal).

In contrast, if the evaluated parameter setting is found in step S8 to be not admissible, the adjustment of the corresponding operation parameter is suppressed in step S11 and the user U gets a negative feedback signal, in particular a color-coded feedback signal in step S11. The negative color-coded feedback signal can for instance comprise a red feedback signal. Further, in step S11, a user U can be requested to change the admissible operation parameter setting. In this case, the flow returns to step S6 as illustrated in the flowchart of FIG. 6. The color-coded negative feedback signal can comprise a red feedback signal making the user U aware about the inadmissible operation parameter setting. Besides the request to change the operation parameter setting, a user assistance algorithm executed on the processor 5A of the control unit 5 can also suggest admissible operation parameter settings, in particular operation parameter settings in admissible operation parameter ranges.

The power distribution system 3 provides in a preferred embodiment AC power supply for the connected device comprising for instance three different electrical phases L1, L2, L3 as also shown in FIG. 5. In an alternative embodiment, the power distribution system 3 can also provide a DC power supply for the connected device 2.

The control apparatus 1 may also comprise at least one transformer adapted to transform a received alternating current into a direct current (DC) voltage. In a possible embodiment, the apparatus 1 comprises a motor starter or a variable frequency drive VFD. In the embodiment illustrated in FIG. 4, the apparatus 1 comprises electronic circuits to provide overcurrent protection, overload protection and power supply control. The apparatus 1 can also comprise a circuit for protection of machines or motors connected as loads 2 to the apparatus 1 from electric power surges. The control cabinet can comprise a local power distribution system 3 with power supply rails to which a plurality of apparatuses 1 are connected. The power supply distribution system 3 can provide an AC of 220, 440 or more volts.

The bus interface 17 and the bus 26 illustrated in FIG. 4 comprise a wired bus system for communication between different apparatuses 1. In a possible embodiment, the bus 26 can also comprise a field bus such as Ethernet, Modbus or Profibus. In an alternative embodiment, the bus interface 17 can also comprise a wireless bus interface for exchanging data.

Further embodiments are possible. In a possible embodiment the human machine interface 4 can comprise a transceiver to establish a wireless link to a portable user equipment UE such as a mobile phone or laptop carried by a user. In this embodiment some or all human machine interface elements 12-$i$ can be formed by elements of a GUI of the portable user equipment UE. The wireless link can comprise a NFC link, a WIFI/WLAN link or a Bluetooth link.

A portable user equipment UE can also be connected via a cable such as a USB cable. The housing 9 of the apparatus 1 can comprise one or more USB slots to receive USB cables or USB sticks. The USB interfaces or other wired interfaces can be used to load into the characteristic memory 5C of the control unit 5 characteristics of connectable devices 2 and/or default parameter setting values for device parameters which can be adjusted or fine-tuned by a user by means of human machine interface elements 12-$i$ of the HMI 4. The characteristics or default set values of connected devices 2 can also be loaded by the apparatus 1 from a local memory of the connected device 2 itself. Another option is a download of the characteristics and/or default parameter setting values via the data bus 26 from a central data storage of the system.

In a further possible embodiment the connected device 2 can comprise an associated device identifier ID (such as a serial number) read automatically via a wired or wireless interface from the connected device 2 by the apparatus 1 for determination of the individual device instance. In this way it is e.g. possible to assign determined faults to individual devices which may have been produced in the same faulty production lot or to log errors of individual devices 2.

In a further possible embodiment the HMI 4 of the apparatus 1 may also be pluggable as a separate entity into a front face interface of the housing 9 of the apparatus 1 and may be exchanged with another kind of HMI 4 suited for another type of devices 2 connected to the apparatus 1. A type of device 2 can e.g. comprise an inductive (e.g. motor), restive or capacitive load type. In a further embodiment the pluggable HMI 4 may after its manual separation from the apparatus 1 by a user communicate with a transceiver of the apparatus 1 via a wireless link. In this embodiment the pluggable HMI 4 forms itself a portable user equipment UE.

The control apparatus 1 can interactively address different fault scenarios such as short circuit in motor short circuit, a short circuit in a supply cable, mechanical wear, cable defects, under-voltages, asymmetrical loads, a too high ambient temperature or over-temperature in the device.

The computer-implements method according to the present invention provides sophisticated user guidance including a commissioning assistant where a guided setting of parameters via a main button, arrow keys and display indications can be performed by a user and also including a solution assistant providing automatically recommendations to a user for trouble shooting in case that warnings and fault indications are displayed on a display, e.g. by coloured LED signaling on the device (input/output).

For instance if a fault is detected or observed during start of a motor connected to the control apparatus 1 operating as a motor starter a system environment diagnostics is initiated automatically by the control apparatus 1 for the affected motor to provide relevant technical information and recommendations depending on the found root cause for the fault to a user. These trouble shooting recommendations can be for instance comprise a recommendation to check the motor supply cable, to check a load available, to check for asymmetrical load, or to check for overcurrent due to mechanical overload, wear or winding short-circuit. The recommendation or information can also indicate whether set values are critical, i.e. security relevant, and are in an admissible range, in particular in view of a detected type of the motor or characteristic parameter curves and parameter functions associated with the respective AC or DC motor.

The control apparatus 1 can also perform system-diagnostics and self-diagnostics, i.e. a self-diagnostics of the device, system environment diagnostics for the motor and system environment diagnostics of the busbar power distribution system of the control cabinet.

The invention claimed is:

1. A computer-implemented method for adjusting operation parameters of an electrical device connected via a control apparatus to a power distribution system comprising the steps of:

checking automatically in response to a setting of an operation parameter of said electrical device input by a user by means of a human machine interface element of a human machine interface, HMI, of said control apparatus whether the respective device operation parameter is security-relevant for the operation of the connected electrical device, for the control apparatus itself and/or for the power distribution system;

performing a user authentication of the user if the input operation parameter setting is found to be security-relevant;

evaluating the operation parameter setting of the security-relevant operation parameter input by the successfully authenticated user to determine whether the input operation parameter setting is admissible;

performing automatically an adjustment of the operation parameter of the connected electrical device if the evaluated operation parameter setting of the security-relevant operation parameter input by the authenticated user is determined to be admissible.

2. The computer-implemented method according to claim 1 wherein determining whether the input operation parameter setting is admissible comprises processing by a processor of the control unit of said control apparatus preconfigured or loaded device characteristics of the electrical device connected via a control and data interface to said control apparatus.

3. The computer-implemented method according to claim 1 wherein determining whether the input operation parameter setting is admissible comprises analyzing by a setting value user assistance algorithm executed on a processor of a control unit of said control apparatus setting values of operation parameters with respect to the device characteristics of the connected electrical device to determine whether the setting values of the input operation parameters are within an admissible operation parameter range of the respective electrical device.

4. The computer-implemented method according to claim 3, wherein the device characteristics of the connected electrical device are fetched from a local memory of the connected electrical device via the control and data interface of said control apparatus and are stored in a local device characteristic memory of said control apparatus for further processing by the processor of the control unit of said control apparatus.

5. The computer-implemented method according to claim 1 wherein if the input operation parameter setting values are in conflict with the other operation parameters, the input operation parameter setting is determined by the setting value user assistance algorithm executed on the processor of the control unit of said control apparatus to be not admissible.

6. The computer-implemented method according to claim 1 wherein the setting value user assistance algorithm executed on the processor of the control unit of said control apparatus calculates and adapts automatically admissible operation parameter ranges for operation parameters of the connected electrical device depending on an input or a detected type of the connected electrical device and/or depending on a monitored operation state of the connected electrical device and/or depending on processed sensor data received from sensors provided at the connected electrical device, depending on data exchange with other control units via a data bus and/or depending on a required predefined operation security level.

7. The computer-implemented method according to claim 1 wherein automatic adjustment of the operation parameter setting is performed without user authentication if the operation parameter setting input (SI) by the user is found to be not security relevant.

8. The computer-implemented method according to claim 1 wherein the operation parameter setting input by the user is suppressed if the user is not successfully authenticated or is suppressed if the evaluated parameter setting is determined to be not admissible.

9. The computer-implemented method according to claim 1 wherein the authentication of the user is performed by an authentication mechanism executed by a processor of a control unit of the control apparatus.

10. The computer-implemented method according to claim 1 wherein if the analyzed input setting values of the operation parameters are found to be admissible by the setting value user assistance algorithm executed on the processor of the control unit, a positive feedback signal, in particular a color-coded feedback signal, is output to the user by human machine interface elements of the human machine interface, HMI, indicating that the input setting values of the operation parameters are admissible and the corresponding operation parameters of the connected electrical device are automatically adjusted accordingly by the control unit of the control apparatus.

11. The computer-implemented method according to claim 1 wherein if the analyzed input setting values of the operation parameters are found to be not admissible by the setting value user assistance algorithm executed on the processor of the control unit, a negative feedback signal, in particular a color-coded feedback signal, is output to the user via the human machine interface elements of the human machine interface indicating the inadmissibility of the previously input setting values of the operation parameters and/or a request to change the input setting values of the operation parameters is output via the human machine interface elements of the human machine interface of said control apparatus to the user and/or admissible operation parameter settings, in particular operation parameter settings in admissible operation parameter ranges, are suggested by the setting value user assistance algorithm to the user.

12. The computer-implemented method according to claim 1 wherein a troubleshooting user assistance algorithm executed on the processor of the control unit of said control apparatus does provide automatically troubleshooting assistance to the user in case of inadmissible setting values of the operation parameters and controls light signals sources indicating where a root cause for a detected operation fault is located.

13. The computer-implemented method claim 1 wherein operation faults occurring during operation of the connected electrical device are displayed via the human machine interface to the user and troubleshoot assistance to handle the displayed operation faults is provided by a troubleshooting user assistance algorithm executed on the processor of the control unit of said control apparatus.

14. A control apparatus provided to connect at least one electrical device to a power distribution system, wherein said control apparatus comprises:
a human machine interface having human machine interface elements used to interact with the control apparatus, wherein the human machine interface elements is adapted to display and/or to adjust setting values of operation parameters of the connected electrical device, wherein the operation parameter setting of the connected electrical device is performed by a computer-implemented method for adjusting operation parameters of an electrical device connected via a control apparatus to a power distribution system comprising the steps of:
checking automatically in response to a setting of an operation parameter of said electrical device input by a user by means of a human machine interface element of a human machine interface, HMI, of said control apparatus whether the respective device operation parameter is security-relevant for the operation of the connected electrical device, for the control apparatus itself and/or for the power distribution system;
performing a user authentication of the user if the input operation parameter setting is found to be security-relevant;
evaluating the operation parameter setting of the security-relevant operation parameter input by the successfully authenticated user to determine whether the input operation parameter setting is admissible;
performing automatically an adjustment of the operation parameter of the connected electrical device if the evaluated operation parameter setting of the security-relevant operation parameter input by the authenticated user is determined to be admissible.

15. The control apparatus according to claim 14 wherein access to one or more human machine interface elements of the human machine interface, HMI, is restricted by at least one access restriction mechanism of said control apparatus to enhance the operation security of the at least one electrical device connected via said control apparatus to said power distribution system and/or to enhance the operation security of the control apparatus and/or of the power distribution system.

16. The control apparatus according to claim 14 comprising a control unit having at least one processor adapted to execute a computer-implemented user assistance algorithm which provides assistance to the user for performing troubleshooting in case of erroneous operation parameter settings and/or adapted to execute a computer-implemented access restriction mechanism.

17. The control apparatus according to claim 15, wherein the access restriction mechanism of said control apparatus comprises a mechanical access restriction mechanism provided by an at least partially transparent protection cover adapted to cover access restricted human machine interface elements of the human machine interface.

18. The control apparatus according to claim 17, wherein the protection cover of the mechanical access restriction mechanism is sealable by a seal which can be broken by a user to get access to the access restricted human machine interface elements after the protection cover has been opened or removed by the user.

19. The control apparatus according to claim 16, wherein the computer-implemented access restriction mechanism of said control apparatus comprises an authentication mechanism executed by the processor of the control unit and used to perform user authentication of a user.

20. The control apparatus according to claim 19, wherein the computer-implemented access restriction mechanism comprises a challenge response authentication mechanism where the user is presented via the human machine interface with a challenge and is successfully authenticated after having provided a valid response to the presented challenge via the human machine interface.

21. The control apparatus according to claim 16, wherein setting values of operation parameters input by the user by means of human machine interface elements of the human machine interface, HMI, are automatically analyzed by a setting value user assistance algorithm executed on a processor of a control unit of the control apparatus with respect to device characteristics of the at least one connected electrical device to check whether the input setting values of the operation parameter are admissible to enhance the operation security of the connected electrical devices and/or the operation security of the power distribution system and/or the operation security of the control apparatus.

22. The control apparatus according to claim 21, wherein the input setting values of the operation parameters are found to be not admissible by the setting value user assistance algorithm executed on the processor of the control unit if the analyzed setting values of the operation parameters input by the user are not within predefined admissible operation parameter ranges or are in conflict with setting values of other operation parameters.

23. The control apparatus according to claim 21, wherein if the analyzed input setting values of the operation parameters are found to be admissible by the setting value user assistance algorithm executed on the processor of the control unit a positive feedback signal, in particular a color-coded feedback signal, is output to the user by human machine interface elements of the human machine interface indicating that the input setting values of the operation parameters are admissible and the corresponding operation parameters of the at least one connected electrical device are automatically adjusted accordingly by the control unit of the control apparatus.

24. The control apparatus according to claim 22, wherein if the analyzed input setting values of the operation parameters are found to be not admissible by the setting value user assistance algorithm executed on the processor of the control unit a negative feedback signal, in particular a color-coded feedback signal, is output to the user via the human machine interface elements of the human machine interface indicating the inadmissibility of the previously input setting values of the operation parameters and/or a request to change the input setting values of the operation parameters is output via the human machine interface elements of the human machine interface of said control apparatus to the user and/or admissible operation parameter settings in particular operation parameter settings, inadmissible operation parameter ranges are suggested by the setting value user assistance algorithm.

25. The control apparatus according to claim 16, wherein the setting value user assistance algorithm executed on the processor of the control unit of said control apparatus is adapted to calculate and adapt automatically admissible operation parameter ranges for operation parameters of the at least one electrical device connected to said control apparatus depending on the type of the at least one connected electrical device, a monitored operation state of the at least one connected electrical device, an observed state of the power distribution system, sensor data received from sensors provided at the at least one connected electrical device, data exchanged with other control units via a data bus and/or depending on a required predefined operation security level.

26. The control apparatus according to claim 16, wherein a troubleshooting user assistance algorithm executed on the processor of the control unit of said control apparatus is adapted to automatically provide troubleshooting assistance to the user in case of inadmissible setting values of the operation parameters and to control light signal sources indicating where a root cause for a detected operation fault is located.

27. The control apparatus according to claim 14, wherein operation faults occurring during operation of at least one electrical device connected to said control apparatus are displayed via the human machine interface to the user and troubleshooting assistance to handle the displayed operation faults is provided by a troubleshooting user assistance algorithm executed on the processor of the control unit of said control apparatus.

28. The control apparatus according to claim 14, wherein the control apparatus comprises a wired or wireless bus interface to connect the control unit of the control apparatus to a data bus of the power distribution system through which control units of different control apparatuses of said power distribution system communicate with each other to exchange data.

29. The control apparatus according to claim 14, wherein the power distribution system comprises bus bars, rails or electrical wires adapted to distribute electrical power with the connected electrical devices.

30. The control apparatus according to claim 14 comprising
an overcurrent protection circuit adapted to protect the connected electrical devices against over-currents,
an overload protection circuit adapted to protect the connected electrical devices against overload and/or a power supply control circuit adapted to control the power supply from the power distribution system to the connected electrical devices.

31. The control apparatus according to claim 14, further comprising a data interface used to connect a computer device to the control apparatus and/or comprising a wireless or wired interface used to connect a mobile user equipment to the control apparatus.

\* \* \* \* \*